United States Patent [19]

Tsukada

[11] Patent Number: 4,918,846
[45] Date of Patent: Apr. 24, 1990

[54] DUST SEAL FOR A LINEAR GUIDE APPARATUS

[75] Inventor: Toru Tsukada, Gumma, Japan

[73] Assignee: Nippon Seiko Kabushiki Kaisha, Tokyo, Japan

[21] Appl. No.: 276,159

[22] Filed: Nov. 23, 1988

[30] Foreign Application Priority Data

Nov. 24, 1987 [JP] Japan .............................. 62-178543[U]

[51] Int. Cl.⁵ .......................... F16C 29/06; F16C 29/08
[52] U.S. Cl. ....................................... 384/15; 277/181;
277/189; 277/207 R; 277/237 A; 277/DIG. 4;
277/DIG. 7; 384/45
[58] Field of Search ............... 277/12, 207 R, 58, 181,
277/189, 237 A, DIG. 4, DIG. 7; 384/15, 45

[56] References Cited

U.S. PATENT DOCUMENTS

| | | | |
|---|---|---|---|
| 3,515,444 | 6/1970 | Grabner | 384/15 |
| 4,296,974 | 10/1981 | Teramachi | 384/45 |
| 4,595,244 | 6/1987 | Teramachi | 384/15 |
| 4,693,040 | 9/1987 | Teramachi | 384/45 X |

FOREIGN PATENT DOCUMENTS 63-12903  4/1988  Japan .

Primary Examiner—Allan N. Shoap
Attorney, Agent, or Firm—Basile and Hanlon

[57] ABSTRACT

A dust seal attached to each end of a slider of a linear guide apparatus includes a side seal member which has semicircular seal protrusions protruding inwardly to wipe dust from the ball rolling grooves of a guide rail, formed at both sides thereof. The side seal member has a void portion at a position corresponding to the opening of a bolt inserting hole in the bottom surface of a recessed groove formed in the upper surface of the guide rail to allow dust deposited on the recessed groove to pass through the inside of the slider. The dust seal further includes an axially extending upper seal member made of a spring steel plate attached to the upper inner surface of the slider so as to oppose the upper surface of the guide rail. The upper seal member having a cross section which provides a resilient property, and seal plates secured to the lower surfaces of both sides of wing portions of the upper seal member. The seal plates are resiliently in contact with the flat portions of the ridges at both sides of the recessed groove of the guide rail to prevent the dust on the recessed groove from introduing into the ball rolling grooves.

1 Claim, 4 Drawing Sheets

DUST SEAL FOR A LINEAR GUIDE APPARATUS

BACKGROUND OF THE INVENTION

1. Field of the Invention

The present invention relates to an improvement in a dust seal of a linear guide apparatus.

2. Description of the Prior Art

Generally, a linear guide apparatus includes, as shown in FIG. 9, a guide rail 1 extending in the axial direction, and a slider 2 mounted movably on the guide rail 1 straddling the same. The guide rail 1 has axially extending ball rolling grooves 3 formed in both side surfaces, and a slider main body 2A of the slider 2 has ball rolling grooves (not shown) formed in inner surfaces of both side walls so that the ball rolling grooves of the slider main body respectively correspond to the ball rolling grooves 3 of the guide rail 1. Balls are interposed rollably between the opposing pairs of ball rolling grooves of the guide rail 1 and the slider main body 2. The slider 2 is movable through the rolling of the balls on the guide rail 1 in the axial direction. During movement, the balls interposed between the guide rail 1 and the slider 2 roll to an end of the slider main body 2A. In order to move the slider 2 continuously in the axial direction, it is necessary to circulate the balls. To this end, axially extending through holes (not shown) are formed as ball paths in both side walls of the slider main body 2A. Furthermore, end caps 5 are attached to opposite ends of the slider main body 2A. Each of the end caps 5 has a pair of ball circulating paths having a U-shape curve which connects each of the ball rolling grooves to a corresponding through hole to form a ball circulating path.

The guide rail 1 has an axially extending recessed groove 6, formed in the upper surface of the guide rail 1, extending the entire length thereof. Inserting holes 6A for retaining bolts (not shown) are provided to fix the guide rail 1 to a base (not shown). The bolt inserting holes 6A are formed at predetermined intervals in the axial direction of the guide rail 1. On the upper surface of the guide rail 1, ridges extend along both sides of the inserting holes 6A and the recessed groove 6, and the ridges have flat portions 6B.

The end caps 5 are usually provided with dust seals 10 because dust, dirt, and the like (hereinafter referred to as foreign particles) are apt to be deposited on the ball rolling grooves 3 and the recessed groove 6 upon which the slider 2 moves. The result of these foreign particles is a disturbance of the smooth rolling of the balls.

A dust seal 10 as shown in FIGS. 9 and 10 was previously proposed (Japanese Utility Model Laid-Open Publication No. 60-103623) by the applicant of this application. This dust seal 10 includes metallic plate 7 which is fixed by small screws 11 to end face of the end cap 5 with the rear surface of the metallic plate 7 brought into contact with the end face of the end cap 5. The dust seal 10 further includes a rubber member 8 which is bonded to the front surface of the metallic plate 7. The dust seal 10 is formed with an opening 9 formed in the lower central portion to allow the guide rail 1 to pass therethrough, and the dust seal 10 is formed in a substantially inverted U-shape. The inner edge of the metallic plate 7 which defines the opening 9 has a simple straight shape. On the other hand, the inner edge of the rubber member 8 at which the opening 9 is formed has semicircular shaped seal protrusions 8a corresponding to the ball rolling groove 3, and a trapezoidal shaped seal protrusion 8c corresponding to the recessed groove 6 of the guide rail 1.

Lip portions having an acute angle are formed at the tip ends of the seal protrusions 8a and 8c, and slide on the outer surface of the guide rail 1, including the ball rolling grooves 3 and the recessed groove 6, to wipe out the foreign particles deposited thereon thereby achieving a dust seal.

The reference numeral 13 designates a nipple for supplying lubricant to the ball circulating paths.

In such a dust seal, the foreign particles desposited on the upper surface and the side surfaces of the guide rail are removed by the seal member which is formed to match the shape of the cross section of the guide rail. For this reason the following problems are involved.

The openings of the inserting holes 6A in the upper surface of the guide rail are formed to allow bolts to be inserted therein. It is impossible to wipe and remove foreign particles deposited in the recesses of the inserting holes 6A completely utilizing the seal protrusion 8c having a trapezoid shape. As a result, foreign particles which have passed through the seal protrusion 8c are scattered in the inside of the slider 2, where they can easily intrude into the ball circulating paths to impair the dust sealing function.

When the seal lips are pressed against the surface of the guide rail with a large pressure, a difference in surface pressure caused when the seal protrusion 8c passes over the recess of the inserting hole 6A produces a variation in resistance. Thus, the travelling function of the slider 2 is degraded.

Moreover, unless the opening edge of the bolt inserting hole is bevelled satisfactorily, the lip portion of the trapezoid seal protrusion 8c of the dust seal 10 will be caught by the opening edge. Thus, a resistance is caused against the movement of the slider and the life of the dust seal 10 is shortened.

SUMMARY OF THE INVENTION

It is an object of the present invention to address the above problems and to provide a dust seal for a linear guide apparatus in which foreign particles deposited on the upper surface of the guide rail, in particular, deposited in the insert hole portion of the guide rail are not wiped out, but are allowed to pass through the inside of the slider.

In order to achieve the above object, there is provided a dust seal of a linear guide apparatus, wherein the linear guide apparatus comprises an axially extending guide rail having a bolt inserting hole for securing the guide rail to a base, axially extending ball rolling grooves formed in both side surfaces of the guide rail, and a slider having ball rolling grooves respectively opposing to the ball rolling grooves of the guide rail and supported on the guide rail, for movement in the axial direction, through rolling balls inserted in the ball rolling grooves. The dust seal comprises a side seal member attached to each axially opposite end of the slider having seal protrusions slidably in contact with surfaces of the ball rolling grooves at both sides of the guide rail, and a void portion at a position corresponding to an opening of the bolt inserting hole in the upper surface of the guide rail. An upper seal member is attached to an upper inner surface of the slider so that the upper seal member opposes the upper flat portions of axially extending ridges formed on the upper surface of the guide rail. The upper seal member is formed to have a curved cross section so as to provide a resilient property, and a pair of seal plates are secured to outwardly extending wing portions of the upper seal member for resilient contact with the flat portions of the side ridges of the guide rail, thereby preventing intrusion of foreign particles into the ball rolling grooves.

The foreign particles deposited on the surfaces of the ball rolling grooves of both sides of the guide rail are wiped out by the dust seal member which is slidably in contact with those surfaces.

On the other hand, the foreign particles deposited on the upper surface of the guide rail pass through the void portion of the side seal and through the inside of the slider. During the passage of the foreign particles, even when the foreign particles scatter in the inside of the slider, the upper seal attached to the inner surface of the slider prevents the intrusion of the foreign particles into the ball rolling grooves.

Accordingly, it is possible to effectively prevent the degradation of the sealing performance due to the bolt inserting hole for fixing the guide rail, the degradation of the life of the seal, and the degradation of the travelling performance of the slider due to variations in resistance of the seal in contact with the guide rail.

Furthermore, since the upper seal member exerts a resilient force to the seal plates, to bring the seal plate in resilient contact with the flat portions of the ridges of the guide member, the sealing performance is improved, and vibrations are absorbed to improve the travelling performance of the slider.

DESCRIPTION OF THE PREFERRED EMBODIMENTS

Figure 1:
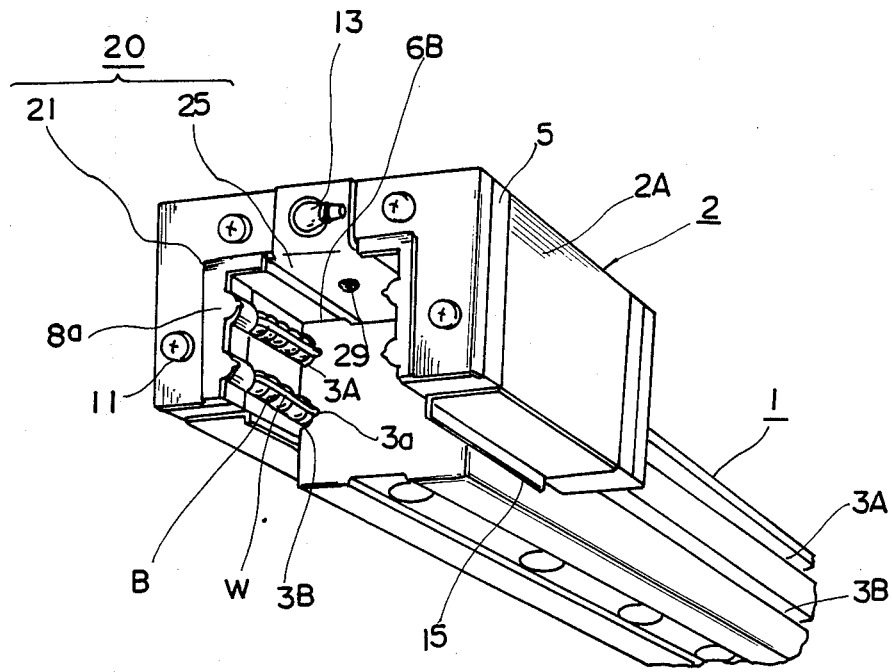
FIG. 1 is a perspective view of an embodiment of a dust seal used with a linear guide apparatus of the present invention.
Figure 2:
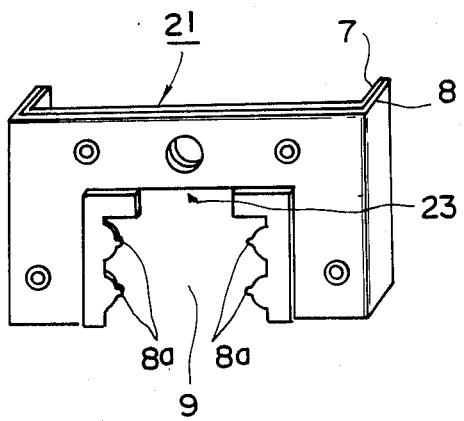
FIG. 2 is a perspective view of the side seal of the dust seal of FIG. 1.
Figure 3:
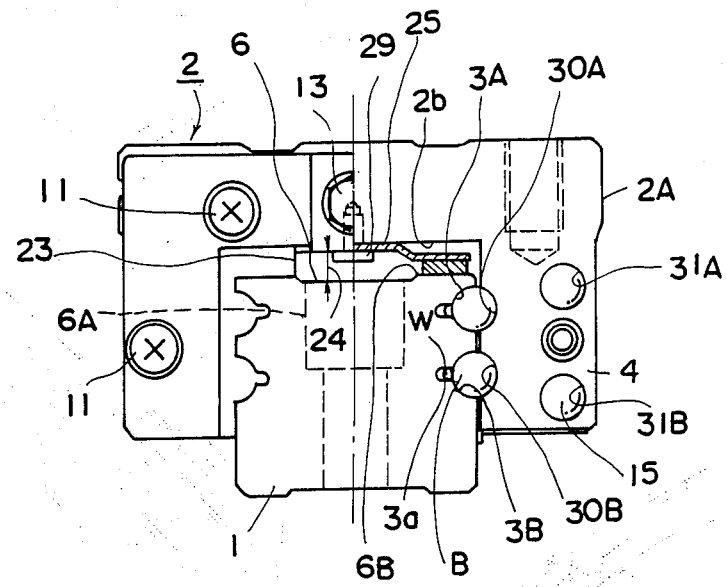
FIG. 3 is a front view of the dust seal of FIG. 1 with a part of the end cap broken away.

FIGS. 1 to 8 show embodiments of the present invention. In these figures, the identical or corresponding parts to the prior art are designated with identical reference numerals and explanations are omitted.

A dust seal 20 comprises a side seal 21 and an upper seal 25. The side seal 21 is fixed, by small screws 11, to the end face of each end cap 5, which are attached to opposite ends of a slider main body 2A. The side seal 21 has seal protrusions 8a having a semicircular cross section and protruding inwardly from the inner side edges of the side seal 21. The seal protrusions 8a slidably contact axially extending ball rolling grooves 3A and 3B formed in both side surfaces of a guide rail 1, with two such ball rolling grooves at each side. However, no trapezoid seal protrusion 8c has been provided, as in the prior art, at a position corresponding to the recessed groove 6c on the upper surface of the guide rail 1 at which the bolt inserting hole 6A is open. Instead of the protrusion 8c, a U-shaped void portion 23 is formed so that a gap 24, shown in FIG. 3, defining a space is formed between the inner upper surface of the slider 2 and the upper surface of the recessed groove 6 of the guide rail 1 to allow foreign particles to pass therethrough.

The upper seal 25 of the dust seal 20 is provided in the inside of the slider 2 to seal the flat portions 6B of the ridges on the upper surface of the guide rail 1.

Figure 4:
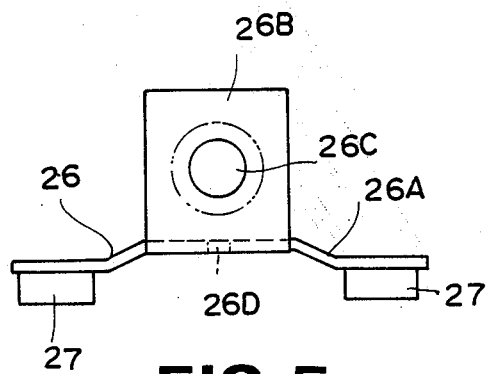
FIG. 4 is a front view of the upper seal member of the dust seal of FIG. 1.
Figure 5:
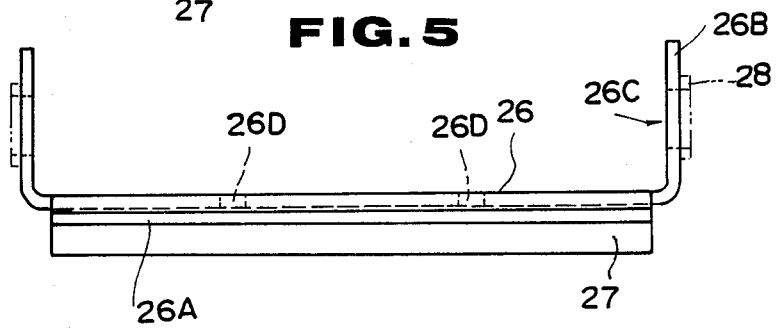
FIG. 5 is a side view of the upper seal member of FIG. 4.

The axially extending upper seal member 25 is attached to the upper inner surface 2b of the slider 2. Upper seal member 25 has an inverted U-shaped cross section which opposes the upper surfaces of the guide rail 1 including the flat ridge portions 6B. More specifically, as shown in FIGS. 4 and 5, the upper seal 25 comprises, for example, a steel plate 26, which may be constructed of spring steel. The steel plate 26, constituting the upper seal member 25, is bent to have a concave or curved cross section in order to provide a spring property. A pair of axially extending seal plates 27 are secured to the lower surfaces of both wing portions 26A of the spring plate 26. The spring plate 26, including the wing portions 26A, is configured to cover the upper inner surface 2b of the slider 2 opposing the upper surface of the guide rail 1, and has fixing portions 26B comprising flanges formed at the axial opposite ends of the spring plate 26. Each of the fixing portions 26B is formed with a through hole 26C for inserting a grease nipple 13. Furthermore, along the axial center line of the spring plate 26, there are screw holes 26D for fixing the upper seal 25 to the slider 2. The material of the seal plates 27 may be of any metal, plastic, synthetic rubber, or the like. In securing the seal plates 27 to the wing portions 26A of the spring plate 26, bonding or welding is preferable in order to avoid scratching the flat portions 6B of the guide rail 1. If a screw or a rivet is used, care should be taken not to protrude beyond the seal plates 27.

The shape of the seal plate 27 is, as a whole, a long, axially extending, plate-shape. However, the cross section of the seal plate may be varied to employ any of the variances shown in FIGS. 6 to 8.

Figure 6:
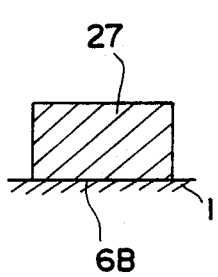
FIGS. 6, 7 and 8 are sectional views of variations of the side seal member.

The seal plate 27 shown in FIG. 6 has a rectangular cross section, and its lower surface is in contact with the whole surface of the flat portion 6B of the ridge on the upper surface of the guide rail 1.

Figure 7:
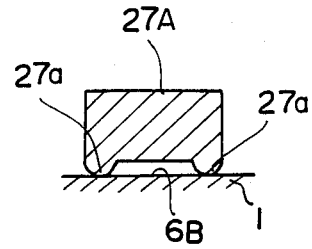

In the seal plate 27A, shown in FIG. 7, both axially extending outer edge portions 27a protrude downwardly so that a plurality of axially extending protruded surfaces are in surface contact with the flat portions 6B of the guide rail 1.

Figure 8:
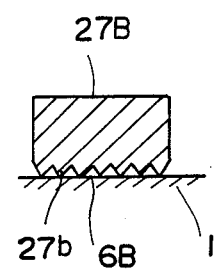
Figure 9:
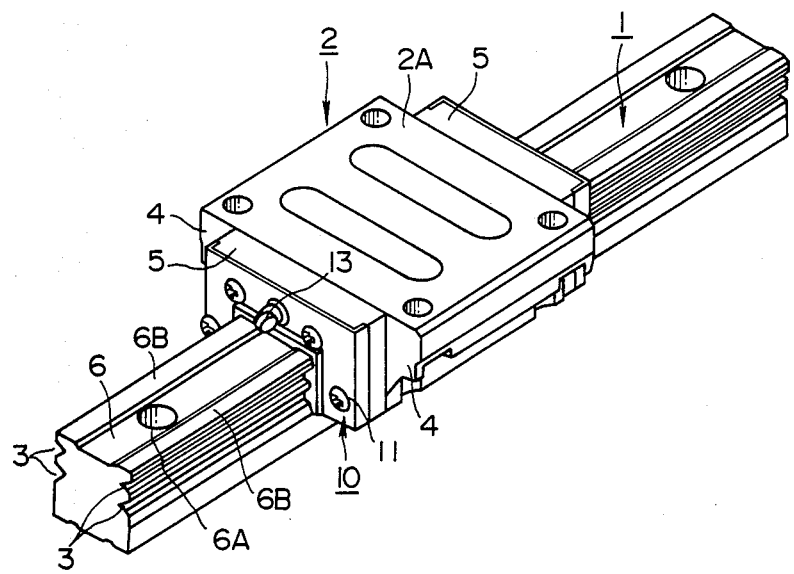
FIG. 9 is a perspective view of a linear guide apparatus with a prior art dust seal attached thereto.
Figure 10:
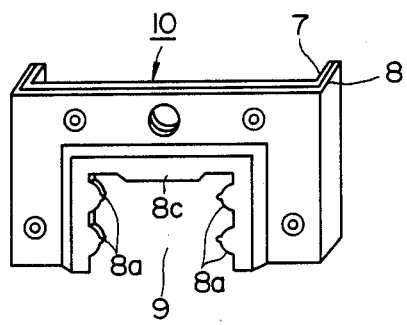
FIG. 10 is a perspective view of the prior art dust seal.

In the seal plate 27B, shown in FIG. 8, a plurality of fine projections 27b, of a labyrinth seal type which extend axially in parallel to each other, are formed on the lower surface of the seal plate 27B. The tip ends of the fine projections 27b are in line contact with the flat portion 6B of the guide rail 1 in the axial direction of the guide rail 1 to enhance the sealing effect.

Alternatively, instead of the axial linear protrusions, a protrusion curved towards the recessed groove 6 of the guide rail 1 may be formed.

With respect to the linear guide apparatus to which the dust seal 20 is used, the ball circulating paths are formed in the same way as in the prior art. Specifically, ball rolling grooves 3A, 3B of the guide rail 1 and respectively opposing ball rolling grooves 30A, 30B formed in the inner surfaces of the side walls of the slider main body 2A comprise ball paths. Through holes 31A, 31B bored in the side walls 4 of the slider main body 2A as ball paths extend in parallel to the ball rolling grooves 30A, 30B. Ball circulating paths (not shown) curved in a U-shape and formed in the end caps 5 bring the ball paths formed by ball rolling grooves 3A, 3B, 30A, 30B into communication with the through holes 31A, 31B to constitute continuous ball circulating routes (not shown).

Furthermore, escape channels 3a, for placement of retaining wire W, are formed in the groove bottoms of the ball rolling grooves 3A, 3B of the guide rail 1. Additionally, reference numeral 15 designates a lower seal.

Next, the function of the dust seal 20 arranged as described above will be described.

The side seal 21 is fixed to the end cap 5, joined to the end of the slider main body 2a, by small screws 22 as in the prior art. The upper seal member 25 is attached to the slider main body 2A by applying the upper surface of the spring plate 26 to the inner upper surface 2b of the slider main body 2A and by fixing by small screws 29. At the same time, the slider 2 is sandwiched at axial opposite ends by the upright fixing portions 26B of the spring plate 26. Furthermore, the grease nipple 13 is inserted through the grease nipple inserting hole 26C bored in the fixing portion 26B, and fixed to the slider 2 interposing a resilient washer 28. For the inserting hole 26C which is not used to attach the grease nipple, a screw having a resilient washer is inserted, and fixed to the slider 2.

The semicircular protrusions 8a of the side seal member 21 wipes and removes foreign particles deposited on the ball rolling grooves 3A and 3B at both sides of the guide rail 1.

On the other hand, the foreign particles deposited on the upper surface of the guide rail 1, in particular, on the recessed groove 6, pass through the void portion 23 of the side seal member 21 and through the inside of the slider 2. In the prior art, the tip end of trapezoid protrusion 8c traverses the surface of the recessed groove 6 and is in line contact therewith. Thus, when the slider 2 moves relatively, its trapezoid protrusion 8c repels and removes the foreign particles. In contrast, in the present invention, the foreign particles are not removed forcibly but are allowed to pass through.

Even when foreign particles scatter in the inside of the slider 2 while they are passing therethrough, the upper seal member 25, attached to the upper inner surface of the slider 2, prevents the intrusion of the foreign particles into the ball rolling grooves 3A, 30A, 3B, 30B, and also into the ball circulating routes in general. Specifically, the seal plates 27 of the upper seal member 25 are pressed against the flat portions 6B on the upper surface of the guide rail 1 by the resilient force of the spring plate 26 thereby achieving a seal.

In the prior art, the foreign particles deposited on the recessed groove 6, once allowed to break through the seal line formed by the line contact of the trapezoid protrusion 8c extending orthogonal to the axis of the guide rail 1, are allowed to reach the ball rolling grooves 3A, 30A, 3B, 30B almost freely. In contrast, in the present embodiment, the seal plates 27 of the upper seal member 25 are in surface or line contact with the flat ridge portions 6B on the upper surface of the guide rail 1, in the longitudinal direction thereof, due to the resilient pressure exerted by the spring plate 26 thereby providing a seal. As a result, the sealing effect is significantly enhanced as compared with the prior art structure.

Furthermore, there is no fear of the seal member being caught by the edge of the bolt inserting hole 6A of the guide rail 1 and being damaged, thus degrading the sealing performance or reducing the life of the seal. In addition, the degradation of the travelling performance of the slider due to variations of the seal resistance can be prevented effectively.

Moreover, by virtue of an appropriate resilience of the spring plate 26 of the upper seal member 25, not only is the sealing performance improved, but also a vibration absorbing action is effected against vibrations. Thus, the travelling performance of the slider is improved.

As described in the foregoing, in the present invention, the seal protrusion in the prior art dust seal, which is slidably in contact with the upper surface of the guide rail is eliminated to allow foreign particles deposited on the upper surface to pass through the inside of the slider. An upper seal member, opposing the upper surface of the guide rail, which has seal plates secured thereto through a spring plate is additionally provided on the upper inner surface of the slider. As a result, no phenomenon occurs, as in the prior art, in which the seal protrusion is caught by the edge of the bolt inserting hole 6A which opens to the upper surface of the guide rail 1. Accordingly, advantages are provided in that a degradation of the sealing function due to the bolt inserting hole, a reduction of the life of the seal, and a degradation of the travelling function of the slider due to variations in seal resistance can all be prevented. Moreover, the upper seal member, attached to the upper inner surface of the slider, is in line contact, or surface contact, with ridge portions which extend axially along both sides of the upper surface of the guide rail resiliently through a spring plate thereby to interrupt the intrusion of the foreign particles into the ball rolling grooves. Accordingly, the seal performance is improved, and at the same time, vibrations are absorbed to stabilize the travelling of the slider.

While certain embodiments of the invention have been described in detail above in relation to a dust seal for a linear guide apparatus, it will be apparent to those skilled in the art that the disclosed embodiment may be modified. Therefore, the foregoing description is to be considered exemplary rather than limiting, and the true scope of the invention, is that defined in the following claims.

What is claimed is:

1. A dust seal of a linear guide apparatus, wherein said linear guide apparatus comprises an axially extending guide rail having a bolt inserting hole for securing said guide rail to a base, axially extending ball rolling grooves formed in both side surfaces of said guide rail, and a slider having ball rolling grooves respectively opposing to said ball rolling grooves of said guide rail and supported on said guide rail, movably in the axial direction, by rolling balls inserted in said ball rolling grooves, said dust seal comprising:

a side seal member attached to each axial end of said slider, having seal protrusions for sliding contact with surfaces of said ball rolling grooves, and having a void portion at a position corresponding to an opening of a bolt inserting hole in the upper surface of said guide rail;

an upper seal member attached to an upper inner surface of said slider opposing axially extending flat ridge portions of said upper surface of said guide rail adjacent to said opening of said bolt inserting hole, said upper seal member being bent to have a cross section which provides a resilient property; and a pair of seal plates secured to wing portions of said upper seal member for resilient contact with said flat ridge portions of the guide rail, thereby preventing intrusion of foreign particles into said ball rolling grooves.

* * * * *